United States Patent
Ku

(10) Patent No.: US 9,432,518 B2
(45) Date of Patent: *Aug. 30, 2016

(54) METHOD AND APPARATUS FOR COMPLETING A CIRCUIT SWITCHED SERVICE CALL IN AN INTERNET PROTOCOL NETWORK

(71) Applicant: AT&T Intellectual Property I, L.P., Atlanta, GA (US)

(72) Inventor: Bernard Ku, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/935,733

(22) Filed: Nov. 9, 2015

(65) Prior Publication Data

US 2016/0065745 A1 Mar. 3, 2016

Related U.S. Application Data

(63) Continuation of application No. 12/334,176, filed on Dec. 12, 2008, now Pat. No. 9,184,940.

(51) Int. Cl.
| | |
|---|---|
| *H04L 12/66* | (2006.01) |
| *H04L 29/06* | (2006.01) |
| *H04L 29/12* | (2006.01) |
| *H04M 1/253* | (2006.01) |
| *H04M 7/12* | (2006.01) |
| *H04W 80/10* | (2009.01) |
| *H04M 7/00* | (2006.01) |

(52) U.S. Cl.
CPC ............... *H04M 7/006* (2013.01); *H04L 12/66* (2013.01); *H04L 61/157* (2013.01); *H04L 65/1069* (2013.01); *H04M 7/0075* (2013.01); *H04L 29/1216* (2013.01); *H04L 29/12896* (2013.01); *H04L 61/106* (2013.01); *H04L 61/308* (2013.01); *H04L 61/3085* (2013.01); *H04M 1/2535* (2013.01); *H04M 7/128* (2013.01); *H04W 80/10* (2013.01)

(58) Field of Classification Search
CPC ................ H04L 12/66; H04L 29/1216; H04L 29/12896; H04L 61/106; H04L 61/157; H04L 61/308; H04L 61/3085; H04L 65/1069; H04M 1/2535; H04M 7/128; H04W 80/10
See application file for complete search history.

(56) References Cited

U.S. PATENT DOCUMENTS 7,529,231 B2 * 5/2009 Soo .................... H04L 29/06027 370/352
9,184,940 B2 * 11/2015 Ku .......................... H04L 12/66

(Continued)

*Primary Examiner* — Parth Patel
*Assistant Examiner* — Kai Chang

(57) ABSTRACT

A method and an apparatus for completing a circuit switched service call in an Internet Protocol network are disclosed. For example, the method receives a session request and queries an tElephone NUmbering Mapping server for a called party, and determines if at least one Naming Authority Pointer resource record associated with the called party is received from the ENUM server. The method determines if a Session Initiation Protocol Universal Resource Identifier is returned, if the at least one NAPTR resource record associated with the called party is received, and processing the session request using the SIP URI, if the SIP URI is returned. The method determines if the processing of the session request using the SIP URI resulted in a successful call completion and processes the session request using a telephone URI, if the processing of the session request using the SIP URI resulted in an unsuccessful call completion.

20 Claims, 4 Drawing Sheets

(56) References Cited

U.S. PATENT DOCUMENTS

| | | | |
|---|---|---|---|
| 2005/0226264 A1* | 10/2005 | Toyoda | H04L 29/06027 370/431 |
| 2005/0286531 A1 | 12/2005 | Tuohino et al. | |
| 2006/0029043 A1 | 2/2006 | Nishida et al. | |
| 2006/0140200 A1 | 6/2006 | Black et al. | |
| 2006/0153166 A1 | 7/2006 | Kobayashi et al. | |
| 2007/0019623 A1 | 1/2007 | Alt et al. | |
| 2007/0104184 A1* | 5/2007 | Ku | H04L 29/1216 370/352 |
| 2007/0165613 A1 | 7/2007 | Soo et al. | |
| 2007/0183394 A1 | 8/2007 | Khandelwal et al. | |
| 2008/0247384 A1 | 10/2008 | Arauz-Rosado et al. | |
| 2008/0247404 A1 | 10/2008 | Yamazaki | |
| 2009/0010250 A1* | 1/2009 | Ganesan | H04L 29/12066 370/352 |
| 2009/0059895 A1 | 3/2009 | Yasrebi et al. | |
| 2009/0093250 A1* | 4/2009 | Jackson | H04L 1/22 455/435.1 |
| 2009/0147770 A1* | 6/2009 | Ku | H04L 65/1069 370/351 |
| 2009/0257429 A1 | 10/2009 | Osborn | |
| 2009/0268726 A1 | 10/2009 | Buckley et al. | |
| 2010/0146066 A1* | 6/2010 | Bian | H04L 51/066 709/206 |

* cited by examiner

METHOD AND APPARATUS FOR COMPLETING A CIRCUIT SWITCHED SERVICE CALL IN AN INTERNET PROTOCOL NETWORK

This application is a continuation of U.S. patent application Ser. No. 12/334,176, filed Dec. 12, 2008, now U.S. Pat. No. 9,184,940, which is herein incorporated by reference in its entirety.

The present invention relates generally to communication networks and, more particularly, to a method and apparatus for completing a circuit switched service call in an Internet Protocol (IP), e.g., an Internet Protocol (IP) multimedia subsystem network, a Voice over Internet Protocol (VoIP) network, a Service over Internet Protocol (SoIP) network, and the like.

BACKGROUND OF THE INVENTION

A customer may initiate a voice or data call session over an IP Multimedia Subsystem (IMS) network. The IMS network may then receive and attempt to route the call towards its destination. In order to perform the routing, the network needs to identify a route for the call. The route may be determined based on the domain serving the called party. For example, the IMS network may first make a determination of whether or not a route to the called party is found over the IMS network. If a route is found over the IMS network, then the call is routed over the IMS network. If no route is found over the IMS network, then the call may then be forwarded to a circuit switched network through one or more circuit switched gateway devices, e.g., a border gateway control function, a media gateway control function, and the like.

However, more and more customers are subscribing to multiple services, where some services are provided over an IMS network and others are provided over non-IMS networks. For example, a customer may subscribe to a video share service provided over an IMS network and the customer may also subscribe to a voice service provided over a Global System for Mobile (GSM) communications network. Hence, when a call destined towards a customer who subscribes to both IMS and non-IMS network based services is received, an attempt to locate a route to the called party over the IMS network may still be performed even if the call cannot be successfully completed over the IMS network.

SUMMARY OF THE INVENTION

In one embodiment, the present invention discloses a method and an apparatus for processing a session request in an IP network. For example, the method receives a session request from a calling party to a called party, wherein the called party uses a registered user endpoint (UE) device. The method queries an tElephone NUmbering Mapping (ENUM) server for the called party of the session request, and determines if at least one Naming Authority Pointer (NAPTR) resource record associated with the called party is received from the ENUM server. The method determines if a Session Initiation Protocol Universal Resource Identifier (SIP URI) is returned in the NAPTR resource record, if the at least one NAPTR resource record associated with the called party is received, and processing the session request using the SIP URI, if the SIP URI is returned. The method determines if the processing of the session request using the SIP URI resulted in a successful call completion and processes the session request using a telephone URI, if the telephone URI is returned and the processing of the session request using the SIP URI resulted in an unsuccessful call completion.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for completing a circuit switched service call in a network. Although the present invention is discussed below in the context of an IP network, e.g., an Internet Protocol (IP) Multimedia Subsystem (IMS) networks, the present invention is not so limited. Namely, the present invention can be applied to packet networks in general, e.g., Voice over Internet Protocol (VoIP) networks, Service over Internet Protocol (SoIP) networks, and the like.

Figure 1:
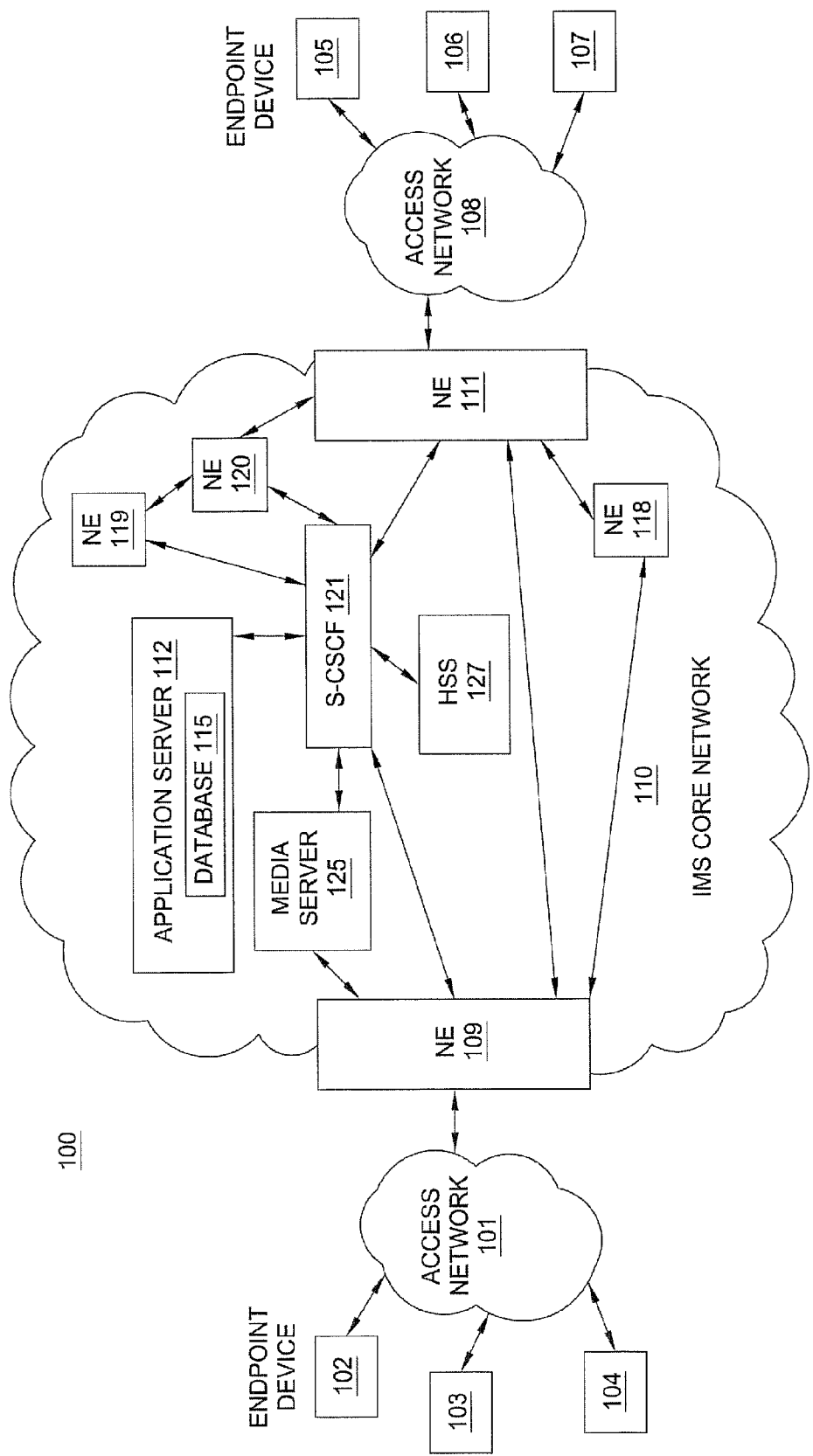
FIG. 1 illustrates an exemplary network related to the present invention.

To better understand the present invention, FIG. 1 illustrates an example network 100, e.g., an Internet Protocol (IP) Multimedia Subsystem network related to the present invention. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a 3$^{rd}$ party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g., VoIP services). The S-CSCF interacts with the appropriate VoIP/SoIP service related applications servers (e.g., application server 112), when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g., various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present invention.

The above IP network is described to provide an illustrative environment in which packets for voice, data and multimedia services are transmitted on IP Multimedia Subsystem (IMS) networks. For example, a customer of an IMS network may initiate a voice or data call. The S-CSCF located in the IMS network may then receive the call and search for a route towards the called party over the IMS network. The route for the call may be determined based on the domain serving the called party.

For example, the S-CSCF may query an ENUM (tElephone NUmbering Mapping) server (described below) to determine routing information (e.g., home domain and how calls are to be routed) for the called party. That is, the S-CSCF in the IMS network makes a determination of whether or not a route to the called party over the IMS network exists. If a route is found over the IMS network, the call may then be routed over the IMS network. If no route towards the called party is found over the IMS network, then the IMS network may then forward the call towards a circuit switched network through one or more circuit switched gateway devices, e.g., a border gateway control function, media gateway control function, and the like. For example, if the called party subscribes only to a service from a Public Switched Telephone Network (PSTN), the IMS network will forward received calls to the PSTN via the border gateway control function and/or media gateway control function.

However, the called party may subscribe to multiple services with at least one of the services provided over the IMS network. For example, the called party may be a subscriber of a video share service provided over an IMS network, and also may be a subscriber of a voice service provided over a Global System for Mobile (GSM) network. Hence, a route to the called party over the IMS network may be found, even if the call is a voice call that cannot be successfully routed over the IMS network. That is, the ENUM server may provide a route, even if using the retrieved route results in the voice call being unsuccessful.

In one embodiment, the current method provides a method for completing a circuit switched service call over an IMS network. In order to more clearly describe the current invention, the following networking terminologies are first provided.

E.164; and
ENUM (tElephone NUmbering Mapping).

E.164 refers to an ITU (International Telecommunications Union)-T recommendation which defines the international public telecommunication numbering plan for formatting telephone numbers such that they may be signaled across one or more networks. The E.164 format includes a country code and subsequent digits, but not the international prefix.

ENUM refers to a standard protocol defined by the Internet Engineering Task Force (IETF) for translating phone numbers that are in E.164 format to Internet domain names such that a Domain Name Server (DNS) may resolve the IP addresses for E.164 numbers the same way it resolves traditional website domains. For example, ENUM may be used to transform a phone, a fax or a pager number into a URI (Uniform Resource Identifier).

In order to translate a phone number to an Internet Domain name, the phone number is first provided in an E.164 format. Specifically, the phone number is first translated or converted to a full E.164 formatted number. For example, the original phone number may not have indicated a country code, area code, etc. However, an E.164 formatted phone number includes a country code, area code and the specific number within the area code. For example, "1" is the country code for all phone numbers in the United States of America (USA). If the original USA phone number is 987-555-1234, it is translated to an E.164 formatted number yielding 1-987-555-1234. The E.164 number is then reduced to digits only, e.g., 19875551234. The digits are then reordered back to front, e.g. 43215557891. Once the digits are reordered, dots are placed between each digit and the Internet domain e164.arpa is added to the end. For the above example, the resulting Internet domain is 4.3.2.1.5.5.5.7.8.9.1.e164.arpa.

An ENUM server may then be queried by the S-CSCF of the calling party to resolve on the domain name 4.3.2.1.5.5.5.7.8.9.1.e164.arpa. For example, an IP Multimedia Subsystem (IMS) network may use an ENUM server to resolve phone number that is in E.164 format, i.e., the contact information of the phone number. The S-CSCF of the calling party may then query a DNS for the regular routing of the contact information resided in the NAPTR (Naming Authority Pointer) resource records, e.g., the SIP URI. In sum, the S-CSCF of the calling party will send the ENUM query and the ENUM server will return the NAPTR resource records if the E.164 number is registered, wherein the S-CSCF then queries the DNS for the destination of the returned records, e.g., the SIP URI of the called party.

It should be noted that the customer may have a set of NAPTR resource records. For example, the customer may have a SIP address, a telephone number, a presence service number, an email address, etc. The query may then retrieve the set of NAPTR resource records for the customer. Table 1 below provides an illustrative example of a query and a response for the above phone number.

TABLE 1

| Query | ORIGIN 4.3.2.1.5.5.5.7.8.9.1.e164.arpa | |
|---|---|---|
| Response | IN NAPTR 100 10 "u" "E2U+SIP" "!^.*$!sip:user@example.com!" | Active |
| | IN NAPTR 100 20 "u" "E2U+pres" "!^.*$!pres:user@example.com!" | Active |
| | IN NAPTR 100 30 "u" "E2U+mailto" "!^.*$!mailto:user@example.com!" | Inactive |

It should be noted that Table 1 above illustrates a response having a plurality of NAPTR resource records. In this illustrative example, each NAPTR resource record contains information pertaining to an order (e.g., represented by the value "100") followed by a preference (e.g., represented by the values "10", "20", and "30"). In one embodiment, the NAPTR resource records are organized based on the order field and the preference field, e.g., from a lowest order value to a highest order value and from a lowest preference value to a highest preference value. For example, in operation, the lowest value (e.g., "10" in this example) in the preference field will be executed first and then followed by the next lowest preference field (e.g., "20" in this example), and so on. This approach allows a call to be directed to a plurality of possible destinations based upon a preferred order or sequence that can be selectively set by the user.

Furthermore, in one embodiment, each NAPTR resource record may also have an activation field that indicates whether a NAPTR resource record is "active" or "inactive." An "active" field indicates that the NAPTR resource record can be used, whereas an "inactive" field indicates that the NAPTR resource record should not be used. Again, this approach allows a user to selectively activate or deactivate a NAPTR resource record. For example, a user may be travelling on a business trip for an extended period of time and does not want calls directed to the user's home number while the user is travelling. As such, the user can selectively designate a NAPTR resource record associated with the user's home number to be "inactive", during the business trip. Upon return from the business trip, the user can selectively designate the NAPTR resource record associated with the user's home number to be "active" again.

If the S-CSCF of the calling party fails to receive a successful NAPTR resource record as a response to the query (queries) sent to the ENUM and DNS, the S-CSCF either rejects the call or assumes that the called party is a customer of a Public Switched Telephone Network (PSTN). If the S-CSCF assumes that the called party is a customer of a PSTN, the S-CSCF of the calling party forwards the call to the PSTN network via a Border Gateway Control Function (BGCF) and/or Media Gateway Control Function (MGCF). If the called party is indeed a customer of the PSTN, then the call may successfully complete over the PSTN.

If the S-CSCF of the calling party receives a NAPTR resource record in response to the query (queries) sent to the ENUM and DNS, the S-CSCF then routes the call to the Interrogating-Call Session Control Function (I-CSCF) of the returned domain for termination. That is, the S-CSCF routes the call to the I-CSCF handling the destination of the returned record. The I-CSCF may then interrogate the HSS to determine the S-CSCF of the called party. If the HSS then returns a Serving-Call Session Control Function Fully Qualified Domain Name (S-CSCF FDQN) of the called party to the I-CSCF, the I-CSCF routes the incoming session request (e.g., SIP INVITE message for the call) to the S-CSCF of the called party, in accordance with the received S-CSCF FDQN. The S-CSCF of the called party (e.g., termination S-CSCF) forwards the call towards the called party via an access Session Border Controller (SBC). The access SBC is used to facilitate interconnection between access and core networks. The access SBC performs routing of the call towards a User Endpoint (UE) device.

In the example above, the called party may be a subscriber of both IMS based and non-IMS based services. Consequently, a NAPTR resource record would be located by the ENUM server regardless of the type of service (i.e., for both IMS and non-IMS based services). Hence, the access SBC may receive calls directed to the customer, even if the call may be for a circuit switched service. The access SBC assumes that the call (e.g., a SIP INVITE) it received is an IP call, and forwards the call towards the UE. If the call is for a circuit switched service (e.g., a voice call to be routed over GSM), the UE is reachable only via the circuit switched network. For the example above, the voice call would successfully complete only if routed to the UE via a circuit switched gateway and the GSM network. Hence, the voice call routed via the access SBC will fail to complete.

In one embodiment, the current method provides circuit switched service call completion in an IP network, e.g., an IMS network. The method first enables subscribers of services to register their UE devices in a common ENUM server. For example, the registering of a UE device comprises placing a SIP URI and a telephone URI in a NAPTR resource record of an ENUM server, wherein the SIP URI is assigned a lower combined value of an order and preference as compared to that of the telephone URI. That is, the customer places both the SIP URI and the telephone URI in the NAPTR resource records with the order fields and preference fields populated such that the SIP URI is the first to be returned when a query is received.

For example, if a customer's E.164 formatted phone number is 1-987-555-1234, the Internet domain is 4.3.2.1.5.5.5.7.8.9.1.e164.arpa. The customer may then place both a SIP and a telephone URI in the NAPTR resource records. A query may then retrieve a set of NAPTR resource records. For illustrative example, the query and response may be as follows:

Query: ORIGIN 4.3.2.1.5.5.5.7.8.9.1.e164.arpa,
Response:
  NAPTR 10 100 "u" "E2U+SIP" "!^.*$!sip:info@example.com!"
  NAPTR 10 101 "u" "E2U+tel" "!^!tel:+19875551234;svc=voice!"

In one embodiment, the method then enables an S-CSCF that receives a session request from a calling party, to first process the returned SIP URI. For example, the originating S-CSCF may forward the session request to the I-CSCF. The I-CSCF may then query the HSS for the S-CSCF serving the domain of the called party. HSS may then provide a response to the I-CSCF identifying the S-CSCF serving the called party. The I-CSCF may then forward the session request to the S-CSCF serving the domain of the called party (termination network) for completion.

If the call is IP based, the SIP URI may then be found in the termination network and the call may be completed. However, if the call is for a service provided over a circuit switched network, forwarding of the session request using the SIP URI will result in an unsuccessful call. That is, the S-CSCF serving the calling party (originating S-CSCF) determines that the session request forwarded over the IMS network resulted in an unsuccessful call.

However, in one embodiment of the present invention, the S-CSCF serving the calling party may then forward the session request using the second returned NAPTR resource record. For example, when using a SIP URI results in an unsuccessful call, the S-CSCF of the calling party may forward the session request using the telephone URI. When the call is routed using the telephone URI, the S-CSCF forwards the session request to the circuit switched network via a BGCF and MGCF. For the example above, the voice call may then reach the called party via the BGCF, MGCF, circuit switched gateway device, and the GSM network.

Figure 2:
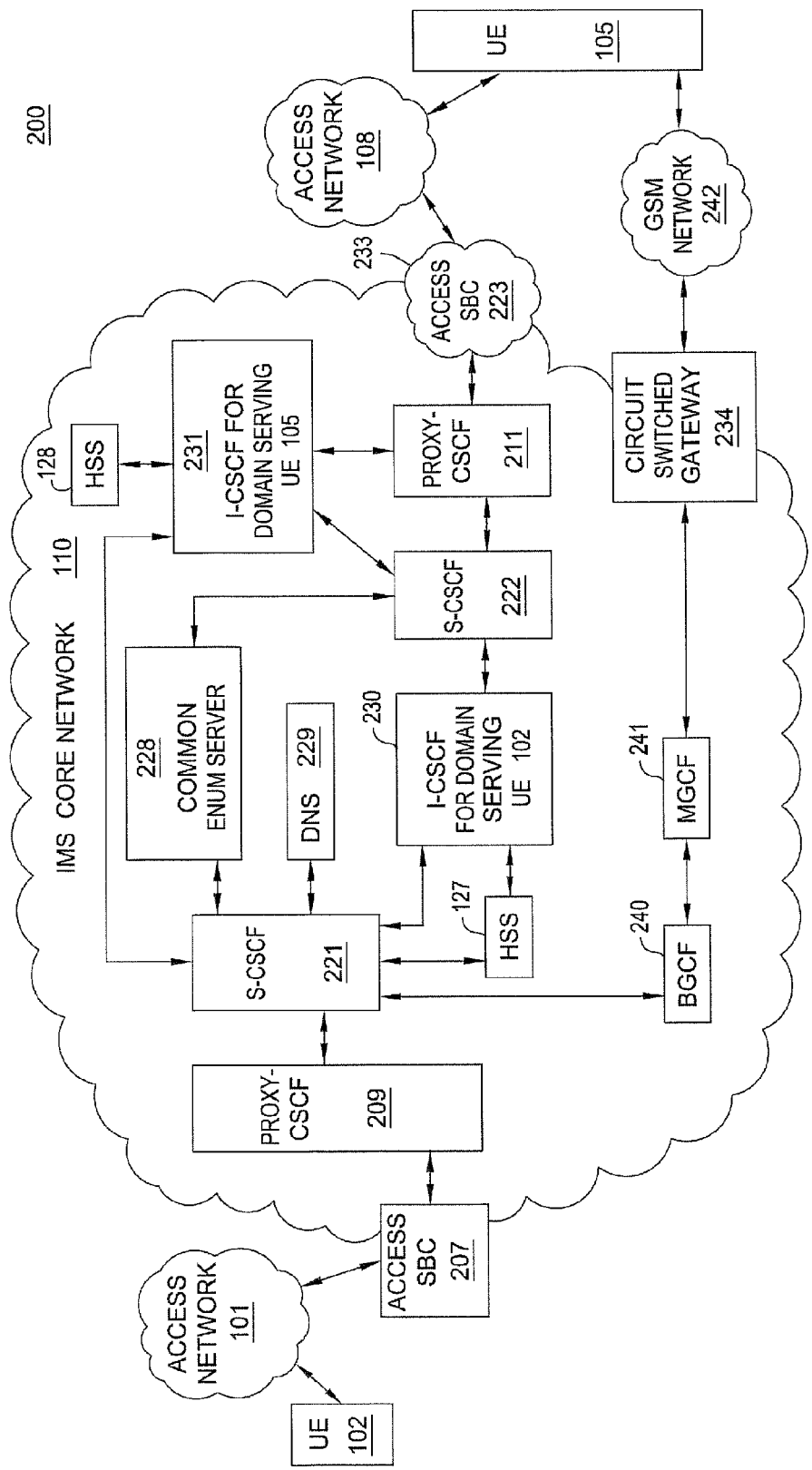
FIG. 2 illustrates an exemplary network in accordance with one embodiment of the current invention for completing a circuit switched service call in an IMS network.

FIG. 2 illustrates an exemplary network 200 in accordance with one embodiment of the current invention for completing a circuit switched service call in an IMS network. In one embodiment, the network 200 comprises User Endpoint (UE) devices 102 and 105 communicating with an IMS network 110 via access networks 101 and 108, respectively.

In one embodiment, the IMS network 110 comprises P-CSCFs 209 and 211, S-CSCFs 221 and 222, I-CSCFs 230 and 231, HSSs 127 and 128, a common ENUM server 228, a DNS 229, BGCF 240, MGCF 241, a circuit switched gateway device 234, and access Session Border Controllers (SBCs) 207 and 233. In order to provide services to customers, the IMS core network 110 is interconnected with the GSM network 242 and the access network 108 via the circuit switched gateway device 234 and the access SBC 233, respectively. In one example, the customer using UE device 102 is accessing services in the IMS network 110 through access Session Border Controller 207, P-CSCF 209, S-CSCF 221 and I-CSCF 230. Similarly, the customer using UE device 105 is accessing services in the IMS network 110 through P-CSCF 211, S-CSCF 222 and I-CSCF 231. The BGCF 240, MGCF 241 and circuit switched gateway 234 are used to route calls from the IMS core network 110 to circuit switched networks, e.g., GSM network 242.

In one embodiment, the current method enables a customer to register his/her UE device in the common ENUM server 228. For example, the customer may register UE device 105 by placing the SIP URI and the telephone URI in a NAPTR resource record of the ENUM server 228. Note that the SIP URI of UE device 105 is assigned a lower combined value of an order and preference as compared to that of its telephone URI.

In one embodiment, if UE 102 initiates a session towards UE 105 (e.g., a SIP INVITE message), the S-CSCF 221 receives the session request via P-CSCF 209. The S-CSCF 221 may then send a query for NAPTR resource records to the common ENUM server 228. The common ENUM server 228 may then return the NAPTR resource records. For example, since UE 105 is registered, the ENUM server 228 may first return the SIP URI and then the telephone URI.

In one embodiment, the S-CSCF 221 may then first process the returned SIP URI. For example, the S-CSCF 221 may query the DNS 229 for the destination of the returned SIP URI of the called party. Using the returned information, the S-CSCF 221 may then forward the session request to the I-CSCF 231. The I-CSCF 231 may then query the HSS 128 for the S-CSCF serving the domain of UE device 105. HSS 128 may then provide a response to the I-CSCF 231 identifying the S-CSCF 222 serving the called party (UE device 105). The I-CSCF 231 may then forward the session request for completion to the S-CSCF 222 that serves the called party.

In one embodiment, if the call is IP based, the SIP URI may then be found in the termination network and the call may be completed. However, if the call is for a service provided over a circuit switched network, forwarding of the session request using the SIP URI will result in an unsuccessful call. That is, if the call is for a service provided over a circuit switched network, the S-CSCF 221 will get a response of an unsuccessful call. In one embodiment of the present invention, the S-CSCF 221 may then forward the session request using the telephone URI, i.e., using the second returned NAPTR resource record.

Figure 3:
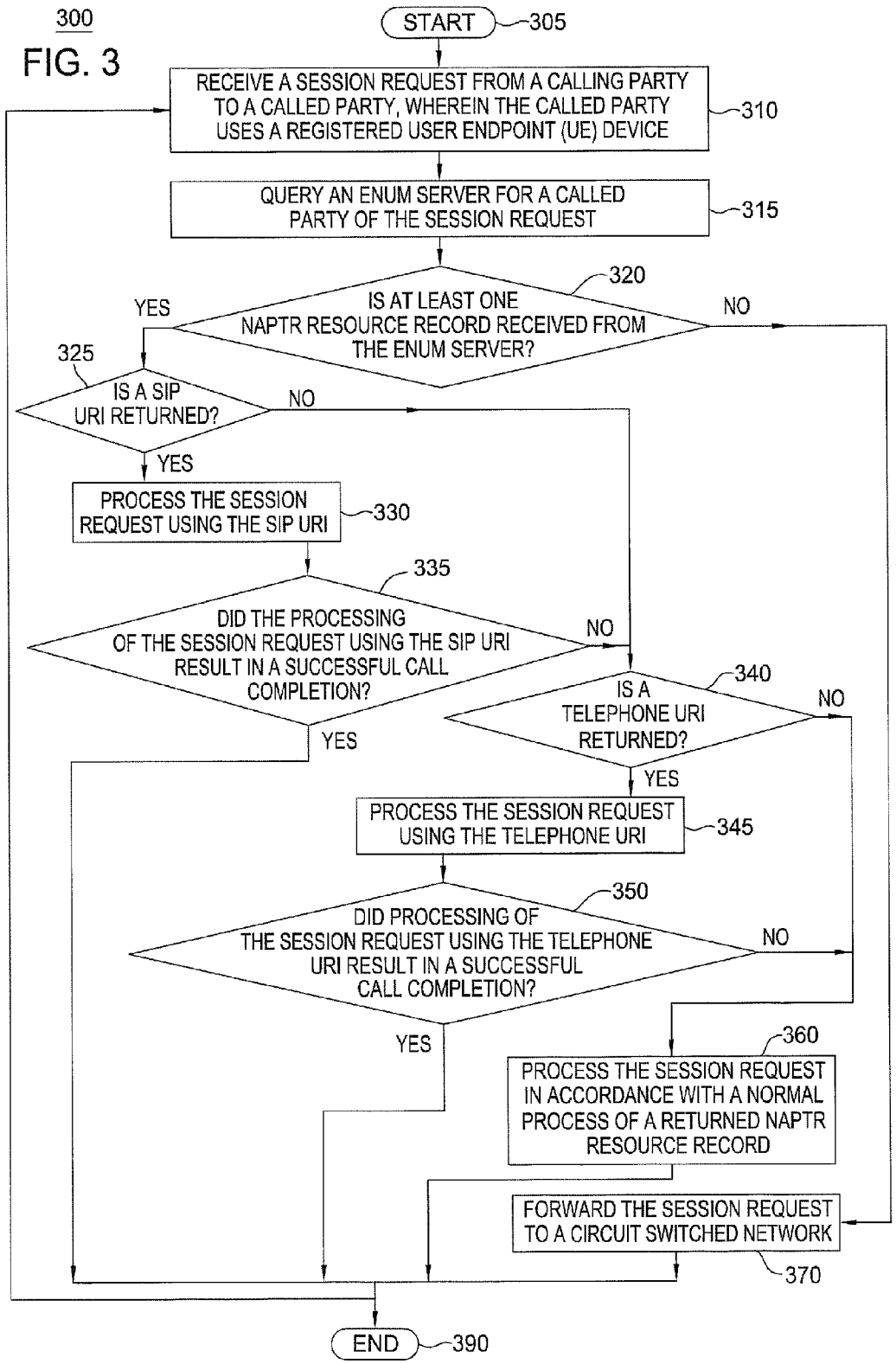
FIG. 3 illustrates a flowchart of a method for completing a circuit switched service call in an IMS network.

FIG. 3 illustrates a flowchart of a method 300 for providing an S-CSCF for completing a circuit switched service call in an IP network, e.g., an IMS network. For example, one or more steps of the step 300 can be implemented in an S-CSCF serving a calling party in an IMS network. Method 300 starts in step 305 and proceeds to step 310.

In step 310, method 300 receives a session request from a calling party to a called party, wherein the called party uses a registered User Endpoint (UE) device. For example, an S-CSCF may receive a SIP INVITE message from a subscriber of a VoIP service through a proxy-CSCF.

In one embodiment, the registering of the UE device has registered a SIP URI and a telephone URI in a NAPTR resource record of an ENUM server, wherein the SIP URI is assigned a lower combined value of an order and preference as compared to that of the telephone URI.

In step 315, method 300 queries an ENUM server for the called party identified in the session request. For example, the method may query the ENUM server for NAPTR records associated with the called party.

In step 320, method 300 determines if at least one NAPTR resource record is received from the ENUM server. If at least one NAPTR resource record is received from the ENUM server, then the method proceeds to step 325. Otherwise, the method proceeds to step 370.

In step 325, method 300 determines if a SIP URI is returned. For example, the called party may have registered the UE device. If a SIP URI is returned, the method then proceeds to step 330. Otherwise, the method proceeds to step 340.

In step 330, method 300 processes the session request using the SIP URI. For example, the S-CSCF may forward the session request towards the called party using the SIP URI. For example, processing the session request using the SIP URI may comprise: querying the DNS for the destination of the returned SIP URI of the called party, forwarding the session request to the I-CSCF using the returned information from the DNS, querying the HSS by the I-CSCF for the S-CSCF serving the domain of the called party, determining by the I-CSCF as to which S-CSCF serves the called party, and forwarding by the I-CSCF the session request to the S-CSCF serving the called party for completion.

In step 335, method 300 determines if the processing of the session request using the SIP URI resulted in a successful call completion. If the processing of the call resulted in a successful call completion, the method ends in step 390 or returns to step 310 to continue receiving more requests. Otherwise, the method proceeds to step 340.

In step 340, method 300 determines if a telephone URI is returned. For example, the called party may have registered both a SIP URI and a telephone URI. If a telephone URI is returned, then the method proceeds to step 345. Otherwise, the method proceeds to step 360.

In step 345, method 300 processes the session request using the telephone URI. For example, the S-CSCF may forward the session request towards the called party using the telephone URI. For example, the method may forward the session request to a GSM communications network serving the called party via a BGCF and MGCF.

In step 350, method 300 determines if the processing of the session request using the telephone URI resulted in a successful call completion. If the processing of the call resulted in a successful call completion, then the method ends in step 390 or returns to step 310 to continue receiving more requests. Otherwise, the method proceeds to step 360.

In step 360, method 300 processes the session request in accordance with a normal process of a returned NAPTR resource record. For example, the query may have returned a NAPTR resource record other than a SIP or a telephone URI. The method may then process the session request in accordance with the order and preference of any other received NAPTR records. The method then ends in step 390 or returns to step 310 to continue receiving requests.

In step 370, method 300 forwards the session request to a circuit switched network. For example, the method may forward the session request to a PSTN for completion, via a circuit switched network gateway device. The method then ends in step 390 or returns to step 310 to continue receiving requests.

It should be noted that although not specifically specified, one or more steps of method 300 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 3 that recite a determining operation or involve a decision, do not necessarily require that both branches of the determining operation be practiced. In other words, one of the branches of the determining operation can be deemed as an optional step.

Figure 4:
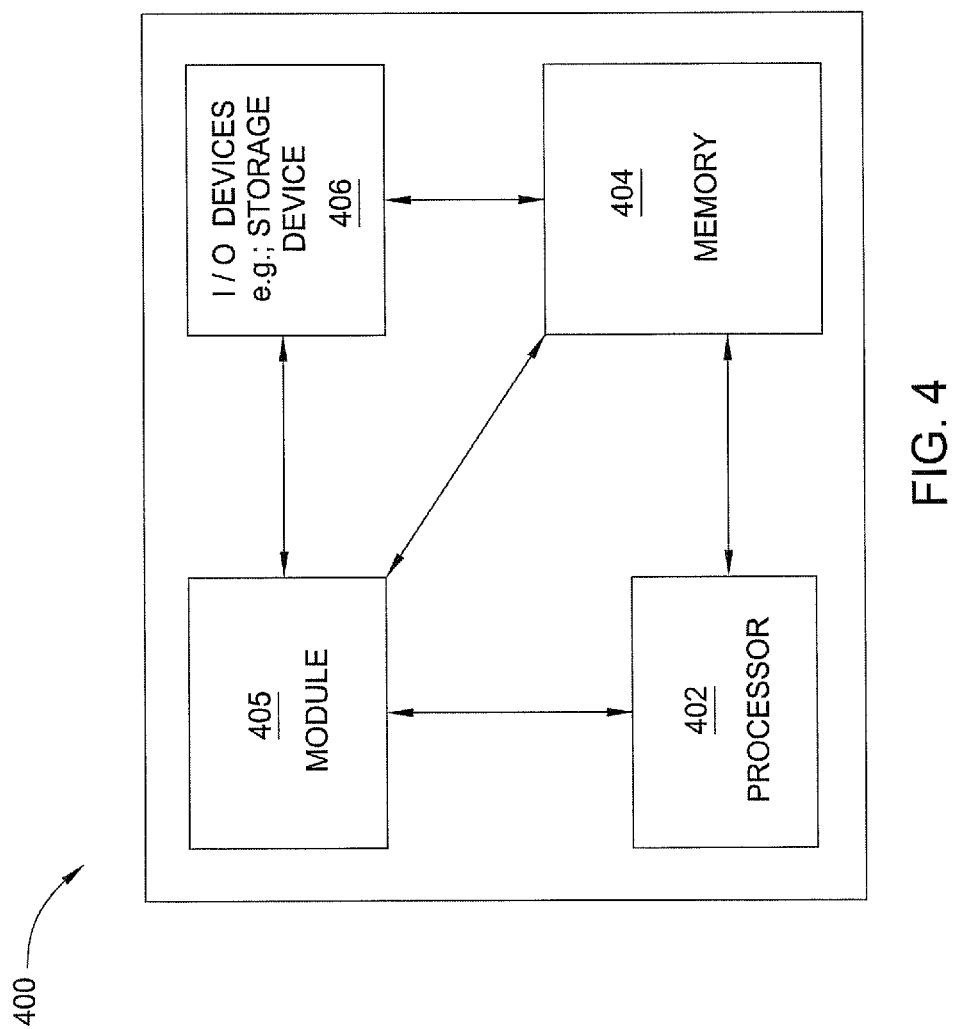
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for completing a circuit switched service call in an IP network, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for completing a circuit switched service call in an IP network can be loaded into memory 404 and executed by processor 402 to implement the functions as discussed above. As such, the present method 405 for completing a circuit switched service call in an IP network (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for processing a session request in an Internet protocol network, the method comprising:
   receiving, by a processor of a serving-call session control function, the session request from a calling party to a called party, wherein the called party uses a registered user endpoint device;
   querying, by the processor, a telephone numbering mapping server for the called party of the session request for a naming authority pointer resource record associated with the called party, wherein the naming authority pointer resource record comprises a session initiation protocol universal resource identifier and a telephone universal resource identifier;
   processing, by the processor, the session request using the session initiation protocol universal resource identifier, wherein the session initiation protocol universal resource identifier returned in the naming authority pointer resource record associated with the called party is received from the telephone numbering mapping server;
   determining, by the processor, whether the processing of the session request using the session initiation protocol universal resource identifier resulted in a successful call completion; and
   processing, by the processor, the session request using the telephone universal resource identifier, when the processing of the session request using the session initiation protocol universal resource identifier resulted in an unsuccessful call completion.

2. The method of claim 1, wherein a registering of the user endpoint device comprises placing the session initiation protocol universal resource identifier and the telephone universal resource identifier in the naming authority pointer resource record of the telephone numbering mapping server, wherein the session initiation protocol universal resource identifier is assigned a lower combined value of an order and a preference as compared to that of the telephone universal resource identifier.

3. The method of claim 1, wherein the internet protocol network comprises an internet protocol multimedia subsystem network.

4. The method of claim 1, further comprising:
   determining, by the processor, whether the processing of the session request using the telephone universal resource identifier resulted in a successful call completion; and
   processing, by the processor, the session request in accordance with a normal process of a returned naming authority pointer resource record, when the processing of the telephone universal resource identifier resulted in an unsuccessful call completion.

5. The method of claim 1, wherein the session request is an invite message in accordance with a session initiation protocol.

6. The method of claim 1, wherein a service is provided over the internet protocol network, wherein the service comprises a video share service.

7. The method of claim 1, wherein the session request is for a service that is provided to the called party over a global system for mobile communications network.

8. A non-transitory computer-readable medium storing a plurality of instructions which, when executed by a processor of a serving-call session control function, cause the processor to perform operations for processing a session request in an internet protocol network, the operations comprising:

receiving the session request from a calling party to a called party, wherein the called party uses a registered user endpoint device;

querying a telephone numbering mapping server for the called party of the session request for a naming authority pointer resource record associated with the called party, wherein the naming authority pointer resource record comprises a session initiation protocol universal resource identifier and a telephone universal resource identifier;

processing the session request using the session initiation protocol universal resource identifier, wherein the session initiation protocol universal resource identifier returned in the naming authority pointer resource record associated with the called party is received from the telephone numbering mapping server;

determining whether the processing of the session request using the session initiation protocol universal resource identifier resulted in a successful call completion; and processing the session request using the telephone universal resource identifier, when the processing of the session request using the session initiation protocol universal resource identifier resulted in an unsuccessful call completion.

9. The non-transitory computer-readable medium of claim 8, wherein a registering of the user endpoint device comprises placing the session initiation protocol universal resource identifier and the telephone universal resource identifier in the naming authority pointer resource record of the telephone numbering mapping server, wherein the session initiation protocol universal resource identifier is assigned a lower combined value of an order and a preference as compared to that of the telephone universal resource identifier.

10. The non-transitory computer-readable medium of claim 8, wherein the internet protocol network comprises an internet protocol multimedia subsystem network.

11. The non-transitory computer-readable medium of claim 8, further comprising:

determining whether the processing of the session request using the telephone universal resource identifier resulted in a successful call completion; and processing the session request in accordance with a normal process of a returned naming authority pointer resource record, when the processing of the telephone universal resource identifier resulted in an unsuccessful call completion.

12. The non-transitory computer-readable medium of claim 8, wherein the session request is an invite message in accordance with a session initiation protocol.

13. The non-transitory computer-readable medium of claim 8, wherein a service is provided over the internet protocol network, wherein the service comprises a video share service.

14. The non-transitory computer-readable medium of claim 8, wherein the session request is for a service that is provided to the called party over a global system for mobile communications network.

15. An apparatus for processing a session request in an Internet protocol network, the apparatus comprising:

a processor of a serving-call session control function; and a computer-readable medium storing a plurality of instructions which, when executed by the processor, cause the processor to perform operations, the operations comprising:

receiving the session request from a calling party to a called party, wherein the called party uses a registered user endpoint device;

querying a telephone numbering mapping server for the called party of the session request for a naming authority pointer resource record associated with the called party, wherein the naming authority pointer resource record comprises a session initiation protocol universal resource identifier and a telephone universal resource identifier;

processing the session request using the session initiation protocol universal resource identifier, wherein the session initiation protocol universal resource identifier returned in the naming authority pointer resource record associated with the called party is received from the telephone numbering mapping server;

determining whether the processing of the session request using the session initiation protocol universal resource identifier resulted in a successful call completion; and processing the session request using the telephone universal resource identifier, when the processing of the session request using the session initiation protocol universal resource identifier resulted in an unsuccessful call completion.

16. The apparatus of claim 15, wherein a registering of the user endpoint device comprises placing the session initiation protocol universal resource identifier and the telephone universal resource identifier in the naming authority pointer resource record of the telephone numbering mapping server, wherein the session initiation protocol universal resource identifier is assigned a lower combined value of an order and a preference as compared to that of the telephone universal resource identifier.

17. The apparatus of claim 15, wherein the internet protocol network comprises an internet protocol multimedia subsystem network.

18. The apparatus of claim 15, further comprising:

determining whether the processing of the session request using the telephone universal resource identifier resulted in a successful call completion; and processing the session request in accordance with a normal process of a returned naming authority pointer resource record, when the processing of the telephone universal resource identifier resulted in an unsuccessful call completion.

19. The apparatus of claim 15, wherein the session request is an invite message in accordance with a session initiation protocol.

20. The apparatus of claim 15, wherein a service is provided over the internet protocol network wherein the service comprises a video share service.

* * * * *